United States Patent
Tate

(10) Patent No.: US 12,524,211 B2
(45) Date of Patent: Jan. 13, 2026

(54) SOFTWARE USE SYSTEM AND SOFTWARE USE METHOD

(71) Applicant: connectFree Corporation, Kyoto (JP)

(72) Inventor: Kristopher Andrew Tate, Kyoto (JP)

(73) Assignee: CONNECTFREE CORPORATION, Kyoto (JP)

( * ) Notice: Subject to any disclaimer, the term of this patent is extended or adjusted under 35 U.S.C. 154(b) by 213 days.

(21) Appl. No.: 18/573,424

(22) PCT Filed: Jun. 24, 2022

(86) PCT No.: PCT/JP2022/025352
§ 371 (c)(1),
(2) Date: Dec. 21, 2023

(87) PCT Pub. No.: WO2022/270626
PCT Pub. Date: Dec. 29, 2022

(65) Prior Publication Data
US 2024/0311102 A1    Sep. 19, 2024

(30) Foreign Application Priority Data
Jun. 25, 2021    (JP) ................................. 2021-105471

(51) Int. Cl.
*G06F 8/36* (2018.01)
*G06F 21/60* (2013.01)
*G06Q 20/12* (2012.01)

(52) U.S. Cl.
CPC .............. *G06F 8/36* (2013.01); *G06F 21/602* (2013.01); *G06Q 20/1235* (2013.01)

(58) Field of Classification Search
None
See application file for complete search history.

(56) References Cited

U.S. PATENT DOCUMENTS

| 5,343,527 A | 8/1994 | Moore |
| 6,684,389 B1 | 1/2004 | Tanaka |

(Continued)

FOREIGN PATENT DOCUMENTS

| JP | 2004110646 A | 4/2004 |
| JP | 2004-206586 A | 7/2004 |
| JP | 2008-146479 A | 6/2008 |

OTHER PUBLICATIONS

Ringert, "Transforming Platform-Independent to Platform-Specific Component and Connector Software Architecture Models", 2015, https://arxiv.org (Year: 2015).*

(Continued)

*Primary Examiner* — Hossain M Morshed
(74) *Attorney, Agent, or Firm* — Merchant & Gould P.C.

(57) ABSTRACT

A software use system includes a storage unit storing one or a plurality of libraries. A package providing unit generates, in response to a request from a software development device, a package with use management information added to a requested library and encrypting the generated package with a public key of the software development device. The package is provided to the software development device. The use management information includes identification information for specifying the software development device. The software development device decrypts the encrypted package with a private key, and after that, provides an environment for developing an application by using the package.

6 Claims, 12 Drawing Sheets

(56) References Cited

U.S. PATENT DOCUMENTS

| | | |
|---|---|---|
| 8,566,949 B2 | 10/2013 | Ikeda |
| 2004/0098348 A1 | 5/2004 | Kawasaki |
| 2008/0141380 A1 | 6/2008 | Ikeda et al. |
| 2012/0324219 A1 | 12/2012 | Braun |
| 2017/0235963 A1* | 8/2017 | Ahn .......................... H04L 9/14 713/190 |
| 2019/0163885 A1* | 5/2019 | Park ...................... H04L 9/0631 |
| 2021/0286758 A1* | 9/2021 | Verma ..................... G06F 21/57 |
| 2021/0319109 A1* | 10/2021 | Weng ..................... G06F 9/4401 |
| 2022/0147378 A1* | 5/2022 | Tarasov ................ G06F 16/196 |
| 2022/0334809 A1* | 10/2022 | Stone ...................... H04L 67/02 |

OTHER PUBLICATIONS

International Search Report for International Application No. PCT/JP2022/025352 (Sep. 13, 2022).

European Rule 62 received for EP Application No. 22828542.5 on May 16, 2025, 8 pgs.

Korean Office Action received for KR Application No. 1020237044227 on May 9, 2025, 11 pgs.

\* cited by examiner

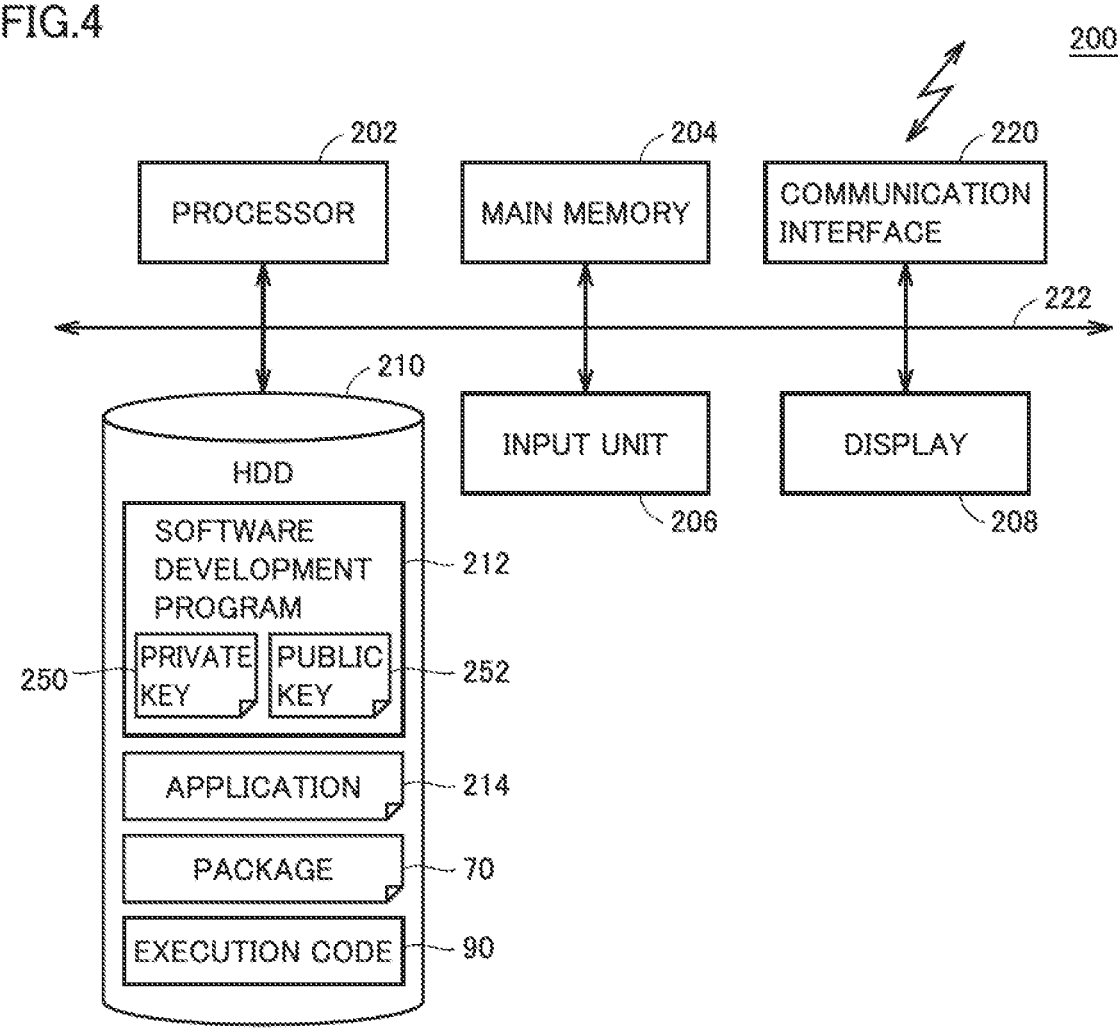

| LIBRARY ID 821 | LIBRARY NAME 822 | OWNER ID 823 | VERIFICATION DATE AND TIME 824 | EXPIRATION TERM 825 | ADDITIONAL INFORMATION 826 |
|---|---|---|---|---|---|
| 6MTQ49S3S4MN | IO PROCESS FOR MODULE A | U16U8OZXWY7I | 2021/01/10 | 2021/12/31 | ... |
| PQE8NN9TW56W | ENCRYPTION COMMUNICATION B | 3QKX6P5H6OR1 | 2021/03/20 | 2022/06/30 | ... |
| 9DSK4ZPMYQ4X | ENCRYPTION COMMUNICATION B | 3QKX6P5H6OR1 | 2021/03/20 | 2022/06/30 | ... |
| ... | ... | ... | ... | ... | ... |

80

84

| LIBRARY ID 841 | MACHINE ID 842 | LICENSE 843 | EXPIRATION TERM 844 |
|---|---|---|---|
| 6MTQ49S3S4MN | 9L8W7980XGZ1 | DEVELOPMENT A | 2021/12/31 |
| 6MTQ49S3S4MN | 4GNWAC2V26GY | DEVELOPMENT B | 2021/10/31 |
| PQE8NN9TW56W | 9L8W7980XGZ1 | DEVELOPMENT A | 2021/08/31 |
| ... | ... | ... | ... |

| ITEM | VALUE | |
|---|---|---|
| LIBRARY ID | 6MTQ49S3S4MN | 541 |
| LIBRARY HASH VALUE | h83bDnuCHeU9qF4uZnz9ShD6 | 542 |
| MACHINE ID | 9L8W7980XGZI | 543 |
| PUBLIC KEY | 2001DB8000000008800289C787A | 544 |
| LICENSE | DEVELOPMENT + EXECUTION | 545 |
| EXPIRATION TERM | 2021/10/31 | 546 |
| MANAGEMENT SERVER ADDRESS | 2001DB8000000008800819ADC3 | 547 |

SOFTWARE USE SYSTEM AND SOFTWARE USE METHOD

This application is a National Stage Application of PCT/JP2022/025352, filed Jun. 24, 2022, which claims benefit of priority to Japanese Patent Application No. 2021-105471, filed Jun. 25, 2021, and which applications are incorporated herein by reference. To the extent appropriate, a claim of priority is made to each of the above disclosed applications.

TECHNICAL FIELD

The present disclosure relates to a software use system and a software use method.

BACKGROUND ART

In the recent years, with advances in information and communication technology (ICT), various things are connected to networks such as the Internet. For this reason, software development becomes increasingly important.

In general, the speed of software development increases by reusing existing software resources. For example, JP 2004-206586 A (Patent Document 1) discloses a software component distribution support method that effectively promotes distribution of software components used when developing a project.

CITATION LIST

Patent Document

Patent document 1: JP 2004-206586 A

SUMMARY OF THE INVENTION

Problem to be Solved by the Invention

JP 2004-206586 A (Patent Document 1) assumes that software components are used within a single system, but in reality, software components are used within the scope where a software component provider cannot control the software components.

The typical object of the present disclosure is to provide a solution capable of more easily realizing management related to the use of software.

Means for Solving Problem

According to one embodiment of the present disclosure, there is provided a software use system including: a storage unit storing one or a plurality of libraries; and a package providing means generating, in response to a request from a software development device, a package with use management information added to a requested library and encrypting the generated package with a public key of the software development device, and after that, providing the package to the software development device. The use management information includes identification information for specifying the software development device. The software development device decrypts the encrypted package with a private key, and after that, provides an environment for developing an application by using the package.

The use management information may include information on use conditions and an expiration term of the library.

The software development device may be allowed to include at least a portion of the use management information included in the package in an execution code using the library included in the package.

The software development device may be allowed to transmit the request including the identification information for specifying the software development device.

The software use system may further include a management means for managing payment of a use fee to an owner of the library according to the use of the library.

According to another embodiment of the present disclosure, there is provided a software use method including: a step of storing one or a plurality of libraries, and a step of generating, in response to a request from a software development device, a package with use management information added to a requested library and encrypting the generated package with a public key of the software development device, and after that, providing the package to the software development device. The use management information includes identification information for specifying the software development device. The software use method includes, in the software development device, a step of decrypting the encrypted package with a private key, and after that, providing an environment for developing an application by using the package.

Effect of the Invention

According to the present disclosure, management related to the use of software can be more easily realized.

BRIEF DESCRIPTION OF DRAWINGS

FIG. 4 is a schematic diagram illustrating an example of a hardware configuration of a software development device constituting the software use system according to this embodiment;

FIG. 5 is a schematic diagram illustrating an example of library use management information held by the management server of the software use system according to this embodiment;

FIG. 6 is a schematic diagram illustrating an example of use management information included in a package generated by the management server of the software use system according to this embodiment;

MODE(S) FOR CARRYING OUT THE INVENTION

Figure 1:
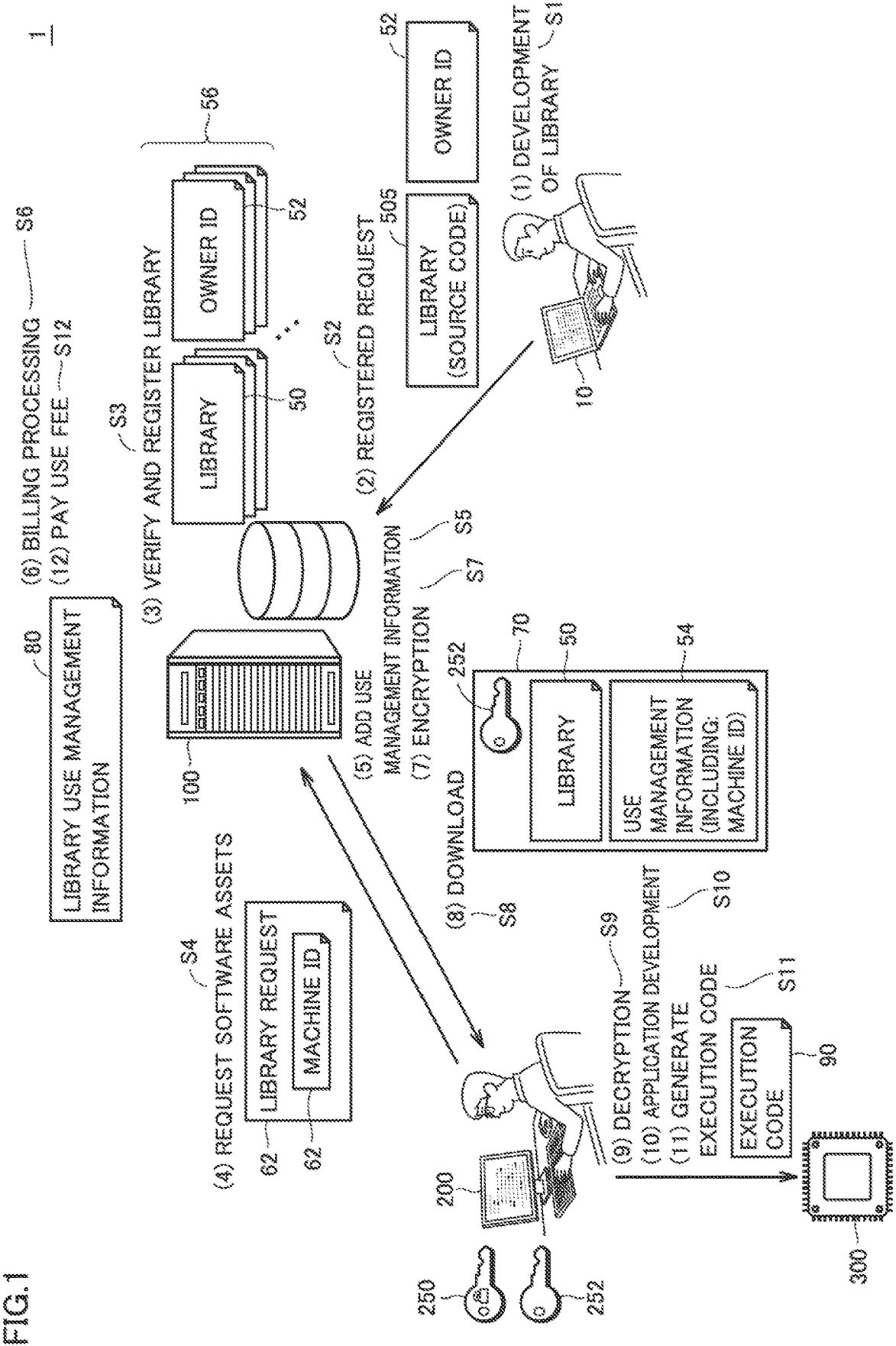
FIG. 1 is a schematic diagram outlining a processing procedure in a software use system according to an embodiment.

Embodiments according to the present disclosure will be described in detail with reference to the drawings. It is noted that the same or corresponding parts in the drawings are designated by the same reference numerals, and the description thereof will not be repeated.

A. Overview

First, an example of a processing procedure related to generation, distribution, and use of software in a software use system 1 according to this embodiment will be described.

FIG. 1 is a schematic diagram outlining the processing procedure in the software use system 1 according to this embodiment. Referring to FIG. 1, the software use system 1 includes a management server 100 and a software development device 200 as main components. In addition, the software use system 1 may also be involved with the individual or corporation (hereinafter also referred to as a "library developer 10") developing the library and the individual or corporation (hereinafter referred to as an "application developer 20") developing the application by using the library.

In this specification, a "library" includes software assets that can be used to develop applications. For example, the library may be distributed in any form such as class, function, function block, procedure, package, and the like. Furthermore, the distribution format of the library may be any format, such as a source code, intermediate representation, an object format, or an execution format.

In this specification, "application" includes any program. That is, the application is not limited to the program for executing a specific process, but may include a program constituting at least a portion of an OS (Operating System). Further, the format of the application may be any of a source code, intermediate representation, an object format, execution format, and the like.

Figure 2:
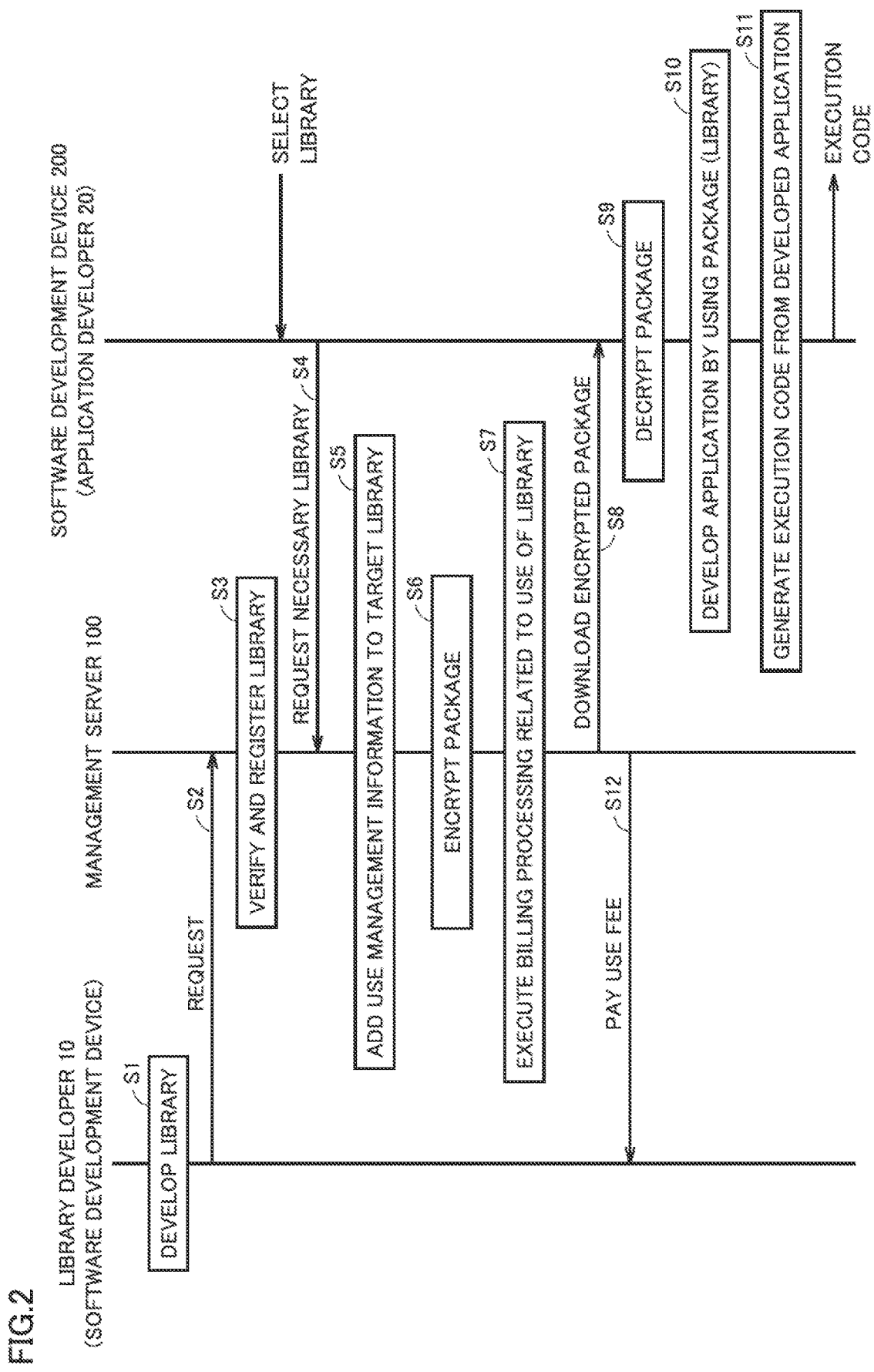
FIG. 2 is a sequence diagram illustrating an example of the processing procedure in the software use system according to this embodiment.

FIG. 2 is a sequence diagram illustrating an example of the processing procedure in the software use system 1 according to this embodiment. Each step illustrated in FIG. 2 is described in association with FIG. 1.

Referring to FIGS. 1 and 2, first, the library developer 10 develops any library 50S (step S1). The library developer 10 requests the management server 100 to register the developed library 50S (step S2). In the registration request, the library 50S is transmitted in a source code format to the management server 100, and an owner ID 52 is assigned. The owner ID 52 is identification information for specifying the library developer 10 who developed the library and is also used for specifying a payment destination of a use fee and the like, when the developed library is used.

The management server 100 verifies the library 50S from the library developer 10, and if there is no problem with the verification result, the management server 100 registers the library 50 in association with the owner ID 52 (step S3). In this manner, the management server 100 sequentially stores the libraries 50 associated with the owner IDs 52 in a database 56. That is, the management server 100 has the database 56 as a storage unit storing one or a plurality of libraries 50. It is noted that the library 50 may be registered as the library 50S in the source code format as is, or may be registered in the intermediate representation or the object format generated from the library 50S.

The management server 100 has library use management information 80. In response to the registration of the library 50 in the database 56, the management server 100 adds the corresponding entry to the library use management information 80. The library use management information 80 includes information for managing the use of the library 50 registered in the database 56.

Each time the library developer 10 develops and registers the library 50, the above-described processing is executed. Next, a case in which the application is developed by using one or the plurality of libraries 50 will be described.

The application developer 20 selects one or the plurality of libraries necessary for application development, and requests the necessary library 50 from the management server 100 (step S4). A library request 60 transmitted from the software development device 200 to the management server 100 includes a machine ID 62. The machine ID 62 is identification information for specifying the software development device 200 that is a transmission source of the library request 60. In this manner, the software development device 200 transmits the request (library request 60) including the identification information (machine ID 62) for specifying the software development device 200.

In response to the library request 60, the management server 100 generates a package 70 for the requested library 50. More specifically, the management server 100 adds use management information 54 to the target library 50 (step S5). As the use management information 54, the data structure and management technology compliant with DRM (Digital Rights Management) may be employed. The use management information 54 includes the machine ID 62. For example, in the use management information 54, a use range of the corresponding library is defined by using the machine ID 62.

Subsequently, the management server 100 encrypts the package 70 including the library 50 with the use management information 54 added (step S6). The software development device 200 has a key pair of a private key 250 and a public key 252. The public key 252 of the software development device 200 transmitting the library request 60 is used to encrypt the package 70.

In this manner, in response to the request (library request 60) from the software development device 200, the management server 100 generates the package 70 with the use management information 54 added to the requested library 50, encrypts the generated package 70 by using the public key 252 of the software development device 200, and after that, provides the encrypted package 70 to the software development device 200. At this time, the use management information 54 includes identification information (machine ID 62) for specifying the software development device 200.

Furthermore, the management server 100 executes billing processing related to the use of the library 50 (step S7). More specifically, the management server 100 adds or updates information necessary for the billing processing to the corresponding entry in the library use management information 80.

Finally, the encrypted package 70 is downloaded from the management server 100 to the software development device 200 (step S8).

The software development device 200 decrypts the encrypted package 70 by using the private key 250 (step S9). Accordingly, the package 70 (library 50) becomes available to the software development device 200.

The application developer 20 develops the application by using the package 70 (library 50) (step S10). The software development device 200 generates an execution code 90 from the developed application (step S11). The generated execution code 90 is provided to any device 300.

The application to be executed on any device 300 is developed through the processing procedure described above. That is, the software development device 200 decrypts the encrypted package 70 by using the private key 250, and after that, provides an environment for developing the application by using the package 70.

Furthermore, the management server 100 pays the use fee related to the use of the library 50 to the library developer 10 (step S12). Any method can be used for payment of the use fee. In this manner, the management server 100 manages the payment of the use fee to the owner of the library 50 (library developer 10) according to the use of the library 50.

In the software use system 1, since the use management information 54 including the machine ID 62 of the software development device 200 of the download destination is added to the downloaded library 50, the possibility that the library 50 will be used illegally in other than the software development device 200 of the download destination can be reduced.

Furthermore, since the package 70 is encrypted by using the public key 252 of the software development device 200 of the download destination, the possibility that the library 50 will be used illegally in other than the software development device 200 of the download destination can be reduced.

B. Example of Hardware Configuration

Next, an example of a hardware configuration of a device constituting the software use system 1 according to this embodiment will be described.

(b1: Management Server 100)

The management server 100 is typically implemented with a general-purpose computer.

Figure 3:
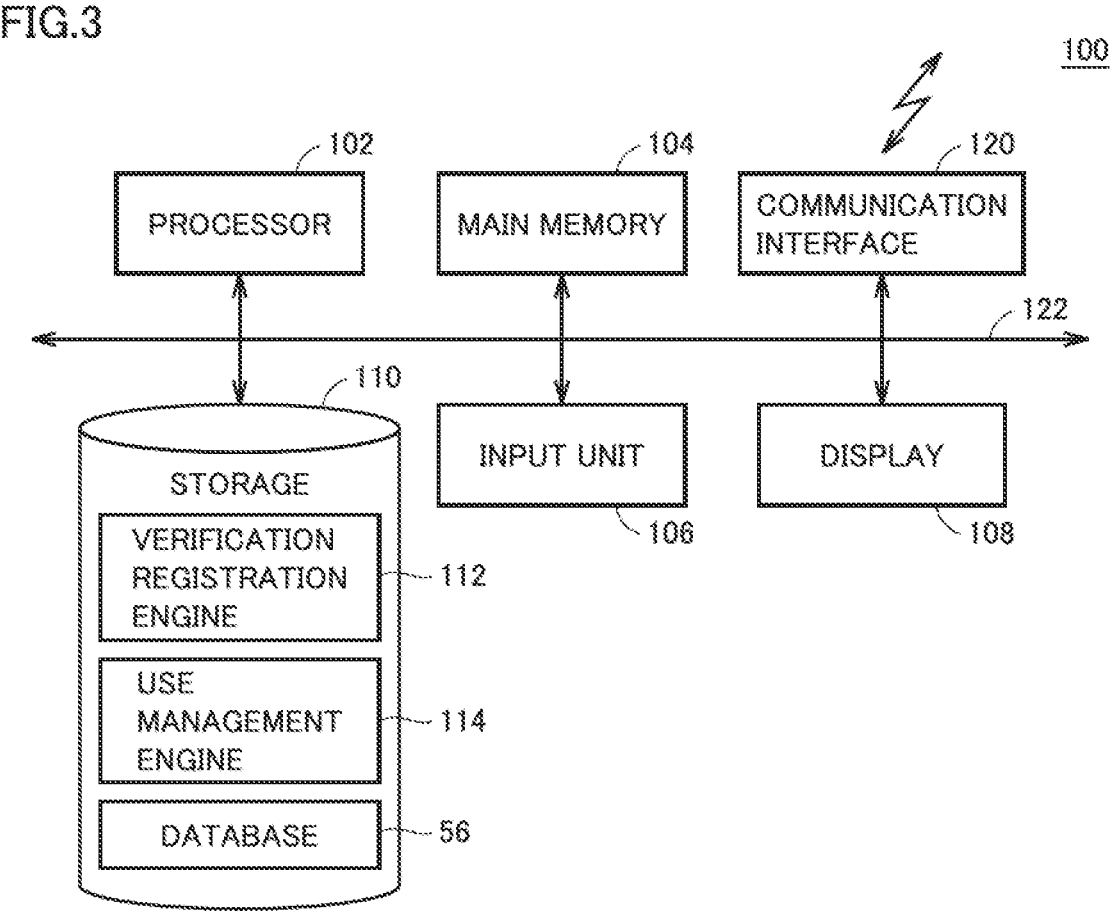
FIG. 3 is a schematic diagram illustrating an example of a hardware configuration of a management server constituting the software use system according to this embodiment.

FIG. 3 is a schematic diagram illustrating an example of a hardware configuration of the management server 100 constituting the software use system 1 according to this embodiment. Referring to FIG. 3, the management server 100 includes one or a plurality of processors 102, a main memory 104, an input unit 106, a display 108, a storage 110, and a communication interface 120 as main components. These components are connected via an internal bus 122.

The processor 102 is configured with, for example, a CPU (Central Processing Unit), a GPU (Graphics Processing Unit), and the like. The plurality of processors 102 may be arranged, or the processor 102 having the plurality of cores may be employed.

The main memory 104 is configured with a volatile storage device such as a DRAM (Dynamic Random Access Memory) or an SRAM (Static Random Access Memory).

The storage 110 is configured with, for example, a nonvolatile storage device such as a hard disk or a solid state drive (SSD).

Among the programs stored in the storage 110, designated codes are loaded on the main memory 104, and the processor 102 sequentially executes computer-readable instructions included in the program code loaded on the main memory 104 to realize various functions as described below.

The input unit 106 accepts any input operation. The display 108 displays the processing results of the processor 102 and the like. The communication interface 120 exchanges data with any external device.

The storage 110 stores a verification registration engine 112 for implementing verification and registration processing of the library 50 for which registration has been requested and a use management engine 114 for implementing processing related to the use of the library 50 in the software development device 200. Furthermore, the storage 110 implements the database 56 in which the library 50 is registered.

(b2: Software Development Device 200)

The software development device 200 is also typically implemented by using a general-purpose computer.

FIG. 4 is a schematic diagram illustrating an example of a hardware configuration of the software development device 200 constituting the software use system 1 according to this embodiment. Referring to FIG. 4, the software development device 200 includes a processor 202, a main memory 204, an input unit 206, a display 208, a storage 210, and a communication interface 220 as main components. These components are connected via an internal bus 222.

The processor 202 is configured with, for example, a CPU or a GPU. The main memory 204 is configured with a volatile storage device such as a DRAM or SRAM. The storage 210 is configured with a nonvolatile storage device such as a hard disk or an SSD and stores various programs executed by the processor 202 and various data.

Among the programs stored in the storage 210, designated codes are loaded on the main memory 204, and the processor 202 sequentially executes computer-readable instructions included in the program code loaded on the main memory 204 to realize various functions as described below.

The input unit 206 accepts any input operation. The display 208 displays the processing results of the processor 202 and the like. The communication interface 220 exchanges data with any external device.

A software development program 212 for realizing an integrated development environment and an application 214 arbitrarily generated by the user are stored in the storage 210. Furthermore, the package 70 downloaded from the management server 100 and the execution code 90 generated from the application 214 may be stored in the storage 210.

The software development device 200 may further include the component for reading the stored program, and the like from a non-transitory medium storing the software development program 212 including computer readable instructions. The medium may be, for example, an optical medium such as a DVD (Digital Versatile Disc), a semiconductor medium such as a USB memory, or the like. It is noted that the software development program 212 may not only be installed in the software development device 200 via the medium, but may also be provided from the distribution server on the network.

(b3: Others)

All or some of the management server 100 and all or some of the software development device 200 may be realized by using a hard-wired circuit such as an ASIC (Application Specific Integrated Circuit) in which the circuit corresponding to computer-readable instructions is incorporated. Alternatively, it may be realized by using the circuit corresponding to computer readable instructions on the FPGA (Field-Programmable Gate Array). Further, it may be realized by appropriately combining the processor, the main memory, the ASIC, the FPGA, and the like.

It is noted that the software development device used by the library developer 10 can also be implemented by using a general-purpose computer.

C. Functional Configuration and Processing of Management Server 100

Next, the functional configuration and processing of the management server 100 will be described.

(c1: Library Use Management Information)

FIG. 5 is a schematic diagram illustrating an example of the library use management information 80 held by the management server 100 of the software use system 1 according to this embodiment. Referring to FIG. 5, the library use management information 80 includes registration management information 82 and use management information 84. Although FIG. 5 illustrates the example in which data is managed in a key-value store format, any data management method may be employed.

The registration management information 82 includes information for managing the library 50 registered in the database 56. The use management information 84 includes information for managing the use of the library 50.

More specifically, the registration management information 82 includes, for each entry, a library ID 821, a library name 822, an owner ID 823, a verification date and time 824, an expiration term 825, and additional information 826.

Identification information for specifying the target library 50 is stored in the library ID 821. The name of the target library 50 is stored in the library name 822. The identification information for specifying the owner of the target library 50 is stored in the owner ID 823. The date and time when the target library 50 is verified is stored in the verification date and time 824. The term when the use of the target library 50 is available is stored in the expiration term 825. Any information related to the target library 50 is stored in the additional information 826.

When the management server 100 is requested to register the new library 50 and there is no problem with the verification results, the management server 100 stores the library 50 in the database 56 and adds a new entry to the registration management information 82.

The use management information 84 includes, for each entry, a library ID 841, a machine ID 842, a license 843, and an expiration term 844.

Identification information for specifying the target library 50 is stored in the library ID 841. Identification information for specifying the software development device 200 by using the target library 50 is stored in the machine ID 842. Alternatively, identification information for specifying the software development program 212 by using the target library 50 may be stored in the machine ID 842. The type of the license as the use condition of the target library 50 is stored in the license 843. The types of the licenses include, for example, the license that allows the software development device 200 to develop the application 214 and allows execution of the execution code 90 generated from the application 214 to be performed without restriction, the license that allows the software development device 200 to be able to only develop the application 214 without restriction, and the license for executing the execution code 90 generated from the application 214, and the like are assumed. The expiration term of the corresponding license is stored in the expiration term 844.

When the use of the library 50 is requested, the management server 100 adds a new entry to the use management information 84 through predetermined processing.

The management server 100 may manage the types and expiration term of the license determined by contracts with the application developers 20 and the like. Alternatively, the entity other than the management server 100 may have a license management function.

(c2: Verification of Library 50)

Verification of the library 50 by the management server 100 includes checking of vulnerabilities included in the library 50, checking of redundancy of codes included in the library 50, and the like. Any process can be used to verify the library 50.

(c3: Use Management Information 54)

FIG. 6 is a schematic diagram illustrating an example of the use management information 54 included in the package 70 generated by the management server 100 of the software use system 1 according to this embodiment. Referring to FIG. 6, the use management information 54 includes a library ID 541, a library hash value 542, a machine ID 543, a public key 544, a license 545, an expiration term 546, and a management server address 547.

Identification information for specifying the target library 50 is stored in the library ID 541. The hash value calculated from the data of the target library 50 is stored in the library hash value 542. Identification information for specifying the software development device 200 to be licensed is stored in the machine ID 543. The value of the public key 252 of the software development device 200 to be licensed is stored in the public key 544. The content or type of the license related to the use of the target library 50 is stored in the license 545. The expiration term of the target license is stored in the expiration term 546. The IP address of the management server 100 and the like is stored in the management server address 547.

It is noted that the information included in the use management information 54 is not limited to the information illustrated in FIG. 6, and any information can be included as necessary.

According to the use management information 54 as illustrated in FIG. 6, the use of the target library 50 and the package 70 including the library 50 is managed.

D. Functional Configuration and Processing of Software Development Device 200

Next, the functional configuration and processing of the software development device 200 will be described.

Figure 7:
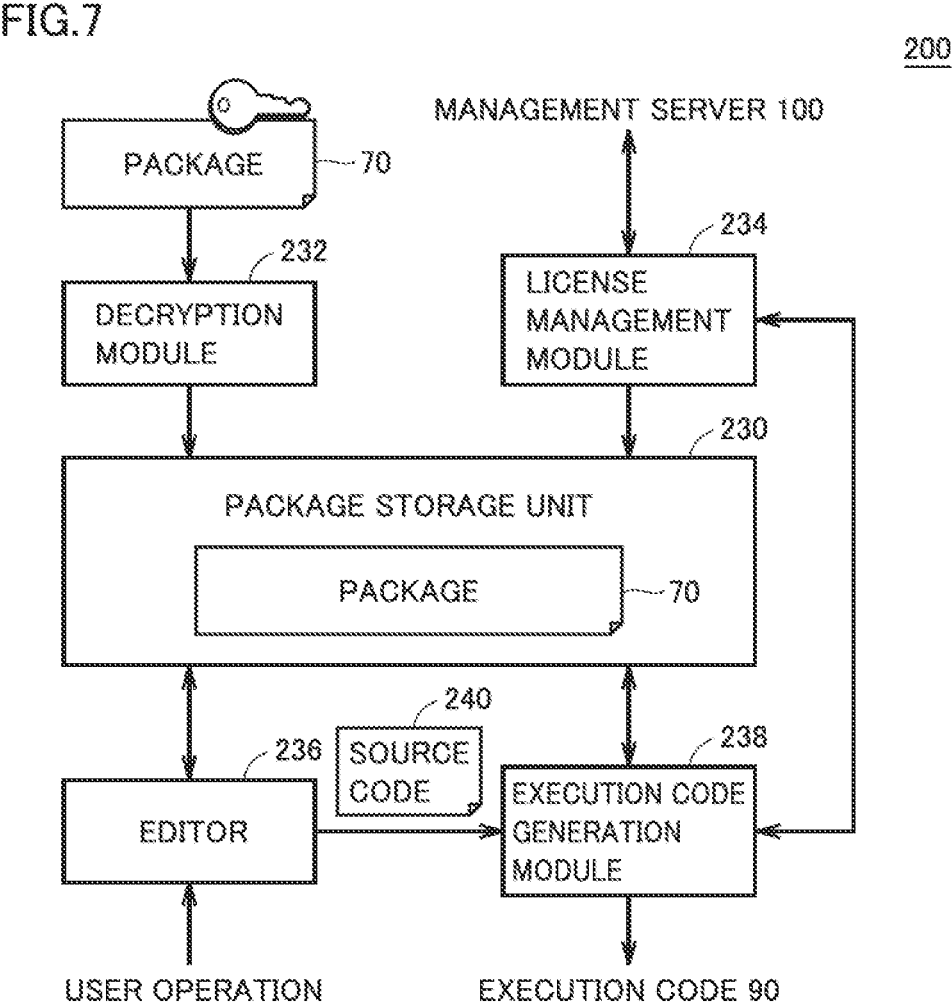
FIG. 7 is a schematic diagram illustrating an example of a functional configuration of the software development device of the software use system according to this embodiment.

FIG. 7 is a schematic diagram illustrating an example of the functional configuration of the software development device 200 of the software use system 1 according to this embodiment.

Each module illustrated in FIG. 7 may be realized by allowing the processor 202 of the software development device 200 to execute the software development program 212.

The software development device 200 includes a package storage unit 230, a decryption module 232, a license management module 234, an editor 236, and an execution code generation module 238 as functional configurations.

The package storage unit 230 stores one or a plurality of packages 70 downloaded by the software development device 200. The decryption module 232 decrypts the encrypted package 70 by using the private key 250. The license management module 234 refers to the library use management information 80 and checks, with the management server 100, whether or not there is a license and what are the contents. The editor 236 provides the environment for developing the application. The user operates the editor 236 to generate a source code 240 of the application.

The execution code generation module 238 generates the execution code 90 corresponding to the application from the source code 240. The execution code generation module 238 includes a parser, a compiler, a linker, and the like. The execution code generation module 238 generates the appropriate execution code 90 from the source code 240 by referring to the library 50 included in the package 70 and the like. In generating the execution code 90, the execution code generation module 238 acquires license information from the license management module 234, and generates the execution code 90 according to the acquired license information.

E. Execution Code

Next, an example of the execution code 90 generated by the software development device 200 will be described.

Figure 8:
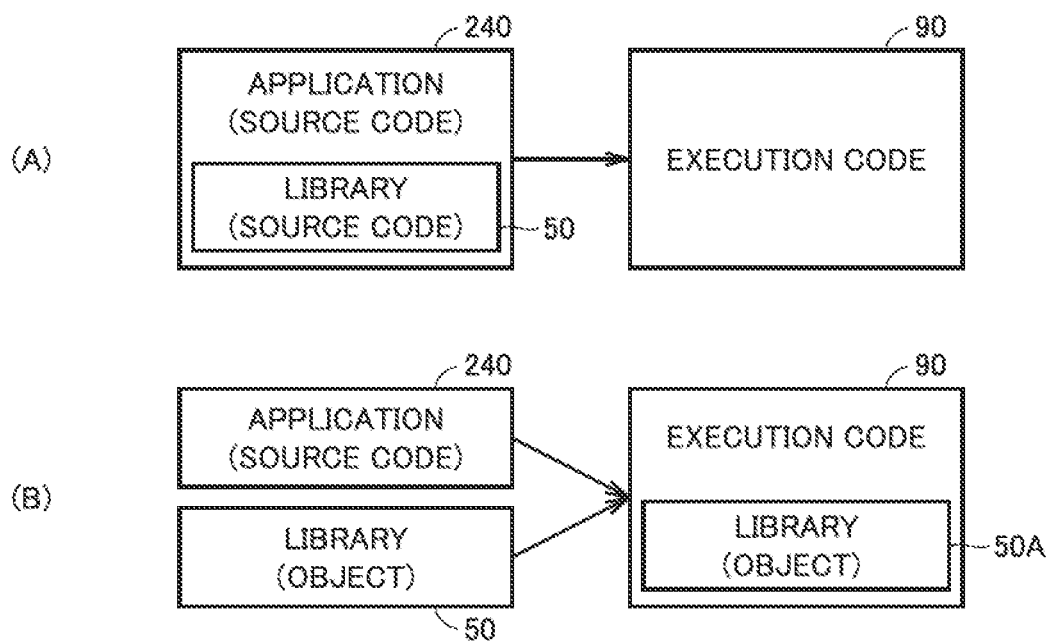
FIG. 8 is a schematic diagram illustrating an example of an execution code generated in the software use system according to this embodiment.

FIG. 8 is a schematic diagram illustrating an example of the execution code 90 generated in the software use system 1 according to this embodiment.

FIG. 8(A) illustrates a case where the library 50 is incorporated in a source code form as a portion of the source code 240 of the application. The execution code 90 is generated by compiling the source code 240 including the library 50.

FIG. 8(B) illustrates a case where the application source code 240 refers to an object-format library 50. In this case, the object-format library 50 is incorporated when the execution code 90 is generated from the application source code 240. It is noted that instead of directly incorporating the object-format library 50 into the execution code 90, the object-format library 50 may be referred to indirectly in the execution code 90.

In this manner, the execution code 90 can be generated by using the method according to the distribution format of the library 50.

The example illustrated in FIG. 8 assumes the license that allows the software development device 200 to execute the application (execution code 90) generated by using the library 50 without any restrictions. However, the license of the library 50 may be checked when installing or executing the application (execution code 90).

Figure 9:
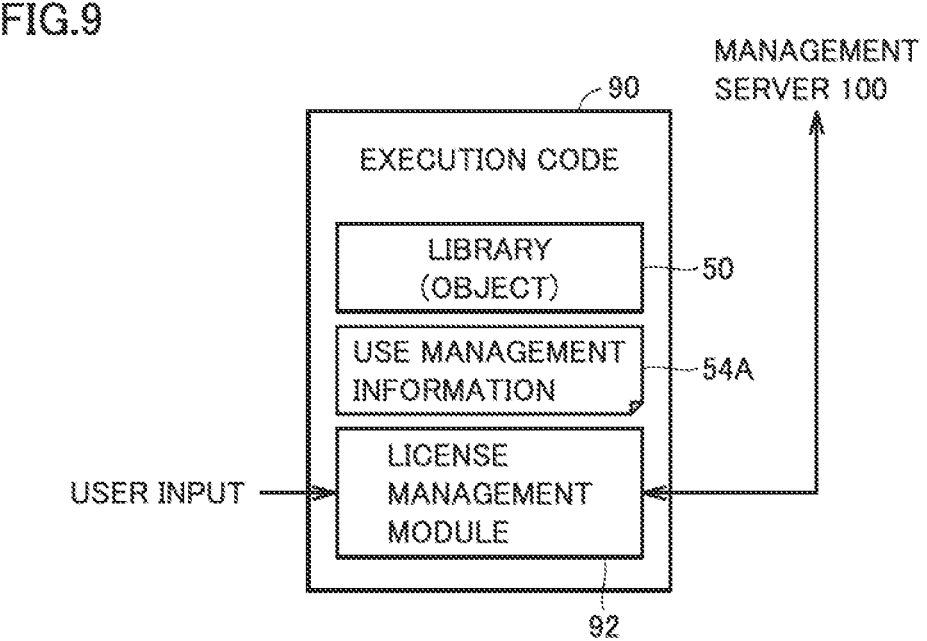
FIG. 9 is a schematic diagram illustrating another example of the execution code generated in the software use system according to this embodiment.

FIG. 9 is a schematic diagram illustrating another example of the execution code 90 generated in the software use system 1 according to this embodiment. FIG. 9 illustrates an example of checking the license when the execution code 90 is executed on the device 300.

Referring to FIG. 9, the execution code 90 includes an object-format library 50, a use management information 54A, and a license management module 92. The software development device 200 generates the use management information 54A including all or a portion of the use management information 54 included in the package 70, and incorporates the use management information 54A into the execution code 90. Furthermore, the software development device 200 incorporates the license management module 92 into the execution code 90 for realizing the process of checking the license.

In this manner, the software development device 200 may include at least a portion of the use management information 54 included in the package 70 in the execution code 90 by using the library 50 included in the package 70.

When the execution code 90 is executed in the device 300, the license management module 92 checks the necessary license by referring to the use management information 54A. For example, the license management module 92 checks that the license necessary for the use of the library 50 exists by transmitting the library ID and machine ID included in the use management information 54A to the management server 100. The execution code 90 may be activated only if the necessary license exists. Alternatively, the license management module 92 may activate the execution code 90 only if the code indicating the license is input.

In this manner, in the example illustrated in FIG. 9, the software development device 200 generates the execution code 90 including the license management module 92 and the use management information 54A, so that the use of the library 50 included in the execution code 90 according to a frequency and a time of the execution of the execution code 90 can be more reliably grasped.

Figure 10:
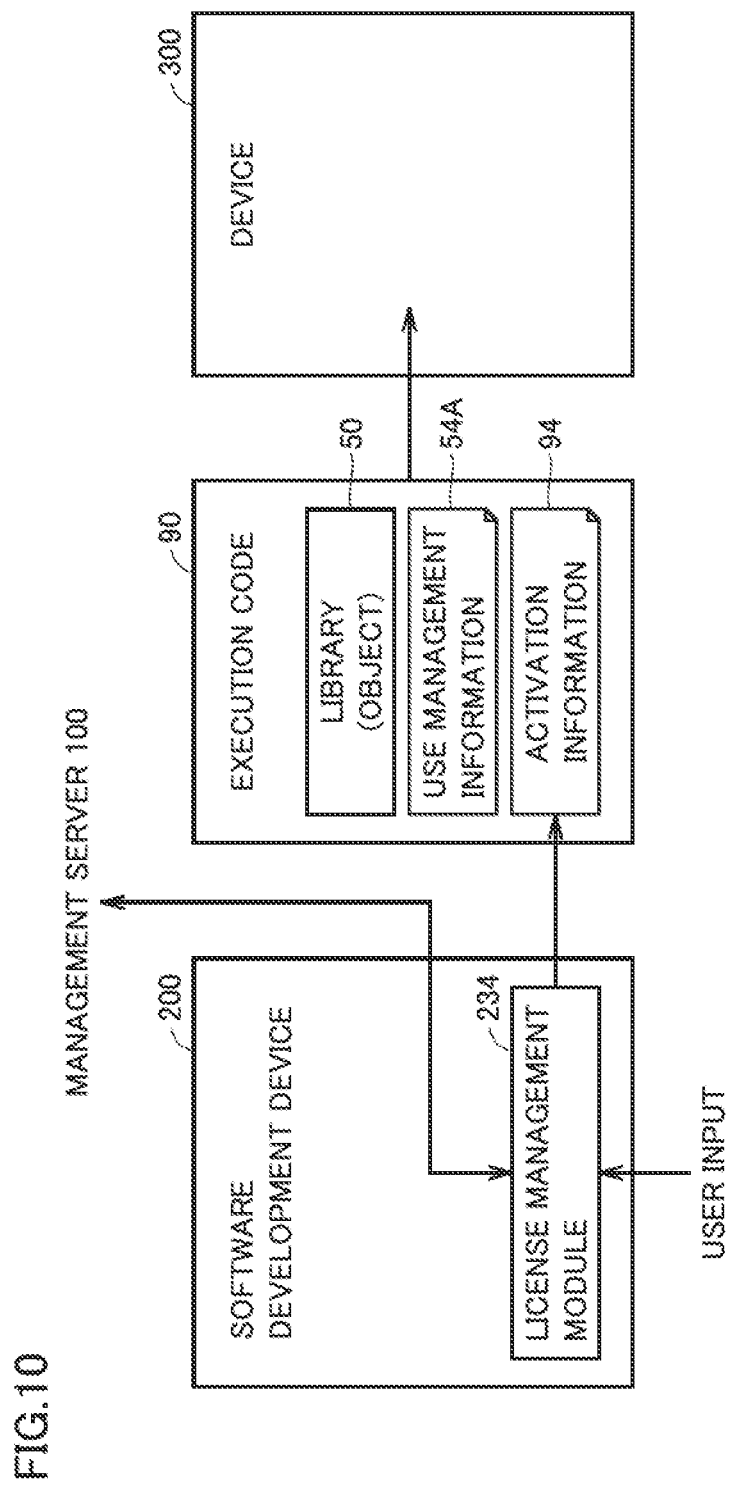
FIG. 10 is a schematic diagram illustrating yet another example of the execution code generated in the software use system according to this embodiment.

FIG. 10 is a schematic diagram illustrating yet another example of the execution code 90 generated in the software use system 1 according to this embodiment. FIG. 10 illustrates an example of checking the license when installing the execution code 90 on the device 300.

Referring to FIG. 10, the execution code 90 immediately after generation includes the object-format library 50 and the use management information 54A. In installing the execution code 90 from the software development device 200 to the device 300, the license management module 234 of the software development device 200 checks the necessary license by referring to the use management information 54A.

For example, the license management module 234 checks that the license necessary for the use of the library 50 exists by transmitting the library ID and machine ID included in the use management information 54A to the management server 100. The license management module 234 may incorporate activation information 94 into the execution code 90 only if the necessary license exists. Alternatively, the license management module 234 may incorporate the activation information 94 into the execution code 90 only if the code indicating the license is input.

The execution code 90 can be executed on the device 300 and the like, only if valid activation information 94 is incorporated.

In this manner, in the example illustrated in FIG. 10, the software development device 200 checks the license when installing the execution code 90 on the device 300, so that the use of the library 50 included in the execution code 90 can be more reliably understood.

Figure 11:
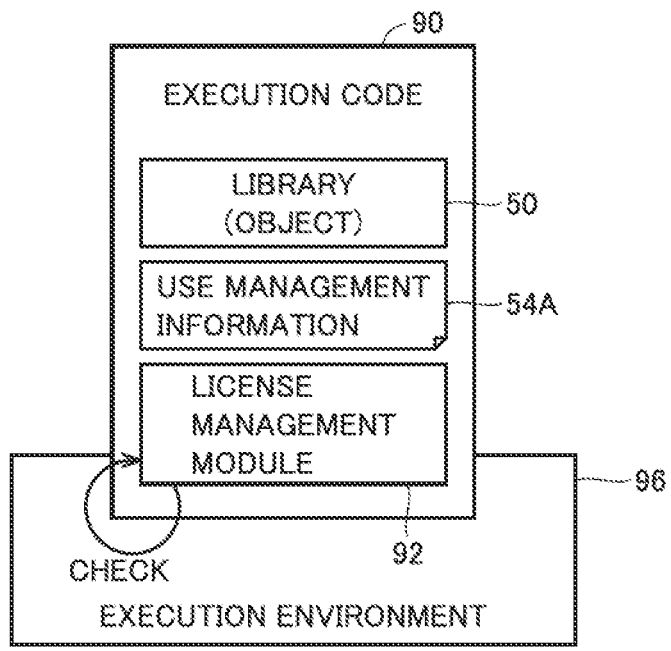
FIG. 11 is a schematic diagram illustrating yet another example of the execution code generated in the software use system according to this embodiment.

FIG. 11 is a schematic diagram illustrating yet another example of the execution code 90 generated in the software use system 1 according to this embodiment. FIG. 11 illustrates an example of checking the execution environment when the execution code 90 is executed.

Referring to FIG. 11, the execution code 90 is executed on an execution environment 96 such as the device. The execution environment 96 includes hardware and software resources of the device on which the execution code 90 is executed. When the execution code 90 is instructed to execute, the license management module 92 included in the execution code 90 determines whether the execution environment 96 in which the execution code 90 is executed conforms to predetermined requirements. When the execution environment 96 does not meet the requirements, the license management module 92 interrupts the execution of the execution code 90.

Examples of the predetermined requirements include processor capability, free memory capacity, presence or absence of a network interface, presence or absence of a security chip, and the like. Furthermore, in the execution environment 96 using the authenticated IP address, it may also be determined whether the IP address is the predetermined IP address or not. Such requirements may be included in the use management information 54A or may be coded inside the license management module 92.

Further, the license management module 92 may also execute the process of checking the license as described above.

As described above, by allowing the license management module 92 to determine whether the execution environment 96 satisfies predetermined requirements, it is possible to ensure that the execution code 90 is executed appropriately.

Figure 12:
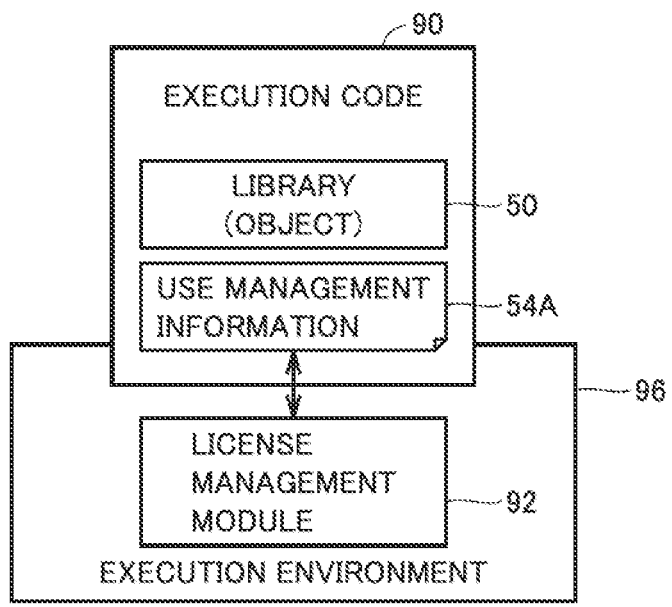
FIG. 12 is a schematic diagram illustrating yet another example of the execution code generated in the software use system according to this embodiment.

FIG. 12 is a schematic diagram illustrating yet another example of the execution code 90 generated in the software use system 1 according to this embodiment. FIG. 12 illustrates an example in which the license management module 92 is prepared in the execution environment 96. The execution environment 96 may be provided, for example, by firmware or the like of the device on which the execution code 90 is executed.

When execution of the execution code 90 is instructed from the execution environment 96, the license management module 92 of the execution environment 96 checks the necessary license by referring to the use management information 54A included in the execution code 90. Further, the license management module 92 may further execute any process described above.

In this manner, by preparing the license management module 92 in the execution environment 96, the size of the execution code 90 itself can be reduced, and integration and distribution into the devices can be made easier.

F. Other Implementation Forms

Although the software development device 200 has the key pair of the private key 250 and the public key 252, the public key 252 may be used as an authenticated IP address. By using the public key 252 of the software development device 200 as an IP address, the package 70 can be transmitted to the software development device 200 assigned with the license for the package 70. Accordingly, the possibility that the destination of the package 70 is to be falsified can be reduced.

G. Advantages

According to the software use system according to this embodiment, the application developer 20 can develop the application by using any library 50 developed by the library developer 10. In the use of the library 50, since the library 50 includes the library use management information 80 according to the software development device 200 of a use destination, the use history of the library 50 and the use fee related to the use can be managed more reliably. By adopting such a mechanism, both the library developer 10 and the application developer 20 have advantages, and enrichment of the library and improvement of the efficiency of application development can be realized.

The embodiments disclosed this time should be considered to be illustrative in all respects and not restrictive. The scope of the present invention is indicated by the claims rather than the above description, and it is intended that equivalent meanings and all changes within the scope of the claims are included.

EXPLANATIONS OF LETTERS OR NUMERALS

1 SOFTWARE USE SYSTEM
10 LIBRARY DEVELOPER
20 APPLICATION DEVELOPER
50, 50S LIBRARY
52, 823 OWNER ID
54, 54A, 84 USE MANAGEMENT INFORMATION
56 DATABASE
60 LIBRARY REQUEST
62, 543, 842 MACHINE ID
70 PACKAGE
80 LIBRARY USE MANAGEMENT INFORMATION
82 REGISTRATION MANAGEMENT INFORMATION
90 EXECUTION CODE
92, 234 LICENSE MANAGEMENT MODULE
94 ACTIVATION INFORMATION
100 MANAGEMENT SERVER
102, 202 PROCESSOR
104, 204 MAIN MEMORY
106, 206 INPUT UNIT
108, 208 DISPLAY
110, 210 STORAGE
112 VERIFICATION REGISTRATION ENGINE
114 USE MANAGEMENT ENGINE
120, 220 COMMUNICATION INTERFACE
122, 222 INTERNAL BUS
200 SOFTWARE DEVELOPMENT DEVICE
212 SOFTWARE DEVELOPMENT PROGRAM
214 APPLICATION
230 PACKAGE STORAGE UNIT
232 DECRYPTION MODULE
236 EDITOR
238 EXECUTION CODE GENERATION MODULE
240 SOURCE CODE
250 PRIVATE KEY
252, 544 PUBLIC KEY
300 DEVICE
541, 821, 841 LIBRARY ID
542 LIBRARY HASH VALUE
545, 843 LICENSE
546, 825, 844 EXPIRATION TERM
547 MANAGEMENT SERVER ADDRESS
822 LIBRARY NAME
824 VERIFICATION DATE AND TIME
826 ADDITIONAL INFORMATION

The invention claimed is:

1. A software use system comprising:
one or more processors:
a storage unit storing one or a plurality of libraries; and
a package providing module generating, in response to a request from a software development device, a package with use management information added to a requested library and encrypting the generated package with a public key of the software development device, and after that, providing the package to the software development device,
wherein the use management information includes identification information for specifying the software development device, and
wherein the software development device decrypts the encrypted package with a private key, and after that, provides an environment for developing an application by using the package.

2. The software use system according to claim 1, wherein the use management information includes information on use conditions and an expiration term of the requested library.

3. The software use system according to claim 1, wherein the software development device includes at least a portion of the use management information included in the package in an execution code using the requested library included in the package.

4. The software use system according to claim 1, wherein the software development device transmits the request including the identification information for specifying the software development device.

5. The software use system according to claim 1, further comprising a management module for managing payment of a use fee to an owner of the requested library according to the use of the requested library.

6. A software use method, comprising steps of:
storing one or a plurality of libraries; and
generating, in response to a request from a software development device, a package with use management information added to a requested library and encrypting the generated package with a public key of the software development device, and after that, providing the package to the software development device, the use management information including identification information for specifying the software development device,
further comprising, in the software development device, a step of decrypting the encrypted package with a private key, and after that, providing an environment for developing an application by using the package.

* * * * *